(12) United States Patent
White

(10) Patent No.: US 6,187,208 B1
(45) Date of Patent: Feb. 13, 2001

(54) TANK CLEANING SYSTEM

(75) Inventor: Theodore Baxter White, Ladysmith (CA)

(73) Assignee: Future Sea Technologies Inc., Nanalmo (CA)

(*) Notice: Under 35 U.S.C. 154(b), the term of this patent shall be extended for 0 days.

(21) Appl. No.: 09/500,918

(22) Filed: Feb. 9, 2000

Related U.S. Application Data

(62) Division of application No. 09/201,161, filed on Nov. 30, 1998, now Pat. No. 6,093,320.

(51) Int. Cl.[7] .............................. B01D 21/26; A01K 63/04
(52) U.S. Cl. ......................... 210/788; 210/788; 119/224; 119/232
(58) Field of Search .................................. 210/787, 788; 119/224, 232

(56) References Cited

U.S. PATENT DOCUMENTS 4,141,318 * 2/1979 MacVane et al. ................ 119/232
5,636,595 * 6/1997 Lunde et al. ..................... 119/232

* cited by examiner

*Primary Examiner*—David A. Reifsnyder
(74) *Attorney, Agent, or Firm*—C. A. Rowley

(57) ABSTRACT

Tank cleaning system is formed by an upper deck having a spout potion and a deck portion, injectors and a separation chamber having a conical bottom wall and a top formed by a waste baffle. The injectors connect the deck portion with the separation chamber so that the waste baffle and upper deck are axially separated to provide an outlet passage therebetween. The injector passages direct water through the upper deck and waste baffle into the lower chamber and impart a significant velocity component tangential to the chamber to the water flowing therethrough to impart a helical flow to the water in the chamber. A debris outlet passage is provided adjacent to the bottom of the lower portion of the chamber. The dirt laden stream enters the chamber through the injectors and dirt is separated by centrifugal action in the chamber and rejected through the debris outlet while the cleaned water passes through the outlet passage and is returned to the surrounding water.

3 Claims, 3 Drawing Sheets

US 6,187,208 B1

TANK CLEANING SYSTEM

This application is a division, of application Ser. No. 09/201,161, filed Nov. 30, 1998, now U.S. Pat. No. 6,093,320.

FIELD OF INVENTION

The present invention relates to a debris separating system, more particularly, the present invention relates to a debris separating system suitable for use in removing sediment from aquatic organisms cultivating tanks.

BACKGROUND OF THE INVENTION

It is common practice to grow aquatic organisms such as fish and the like in tanks or bag like structures for the commercial market.

One of the main problems of these systems is the tendency for sediment to build in the bottom of the tank or to be released into the surrounding waters and cause contamination detrimental to the process or the surrounding environment.

There have been numerous proposals and applied systems for cleaning aquaculture tanks. See for example, Canadian patent 1,117,385 issued Feb. 2, 1982 to Casey, Canadian patent 1,292,919 issued Dec. 10, 1991 to Ragnar et al. and Canadian patent applications, 2,000,443 published Apr. 12, 1990 by Arne et al., 2,072,357 published Jun. 20, 1991 by Jorgensen. See also U.S. Pat. Nos. 3,716,025 issued Feb. 13, 1973 to Lawson, 3,870,018 issued Mar. 11, 1975 to Furchtnicht, 4,141,318 issued Feb. 27, 1979 to MacVane, 4,171,681 issued Oct. 23, 1979 to Burger et al., 4,655,169 issued Apr. 7, 1987 to Paliola and U.S. Pat. No. 5,239,839 issued Mar. 15, 1994 to Jorgensen.

Many of the systems described in the patents use circulation of the water in the tank to deliver the sediment to a sediment outlet for example rotating flow in circular tanks to sweep the sediment toward the centre of the tank. U.S. Pat. No. 4,655,169 referred to above describes a system wherein conical grooves are provided in the bottom end of the tank and a circular flow is imparted into the water in the tank to cause the debris that settles to the bottom of the tank to be swept along the conical grooves into a collecting chamber or sump at the center of the tank. This system obviously relies substantially completely on gravity for separation of the sediment from the water i.e. the sediment falls by. gravity to the bottom of the tank and the thus concentrated debris is swept along the helical bottom passages to a sump.

U.S. Pat. No. 5,639,595 issued Jun. 10, 1997 to Lunde et al. employs an annular chamber or sump surrounding a main tank outlet defined by an upper deck spaced from the bottom of the tank to provide a flow inlet extending around the full circumference of the sump. The sump is frusta-conical tapering towards a bottom end that is provided with a debris outlet adjacent to the central or axial main outlet passage from the tank. Outlet holes connect the sump with the main outlet passage at a position well above the debris outlet in the bottom of the sump. Water carrying debris flows into the chamber substantially radial around the full periphery of the chamber and towards the bottom and then flows back up and out through the outlet passages leading to the main passage. Debris falling from the water entering the sump is removed via the debris outlet. This system does not significantly concentrate the sediment for removal.

The centrifugal separation wherein circular flow at high angular velocity of a sediment containing liquid to apply centrifugal force to concentrate the higher density material adjacent to the outer wall of the chamber is well known, for example, in the pulp and paper art, for separation of fiber and shive from water or the mining industry for increasing the concentration of solids carried in the liquid streams.

BRIEF DESCRIPTION OF THE PRESENT INVENTION

It is an object of the present invention to provide an improved sediment separation system particularly suited for use in aquatic organism cultivation tanks or bags.

Broadly, the present invention relates to a method and apparatus for sediment removal from an aquatic tank having water flow patterns therein comprising a sediment removal device at the lower end of said tank, said sediment removal device comprising a substantially circular collecting chamber having an outer wall forming a substantially conical shaped bottom wall about an axis, a funnel shaped upper deck concentric with said axis and having a substantially conical shaped deck portion tapering to a spout portion concentric with and opening through an apex of said substantially conical shaped bottom wall, a waste baffle closing a significant portion of an upper end of said collecting chamber, said waste baffle being axially spaced from said upper deck to define an outlet passage therebetween, said waste baffle extending in from the periphery of said chamber defined by said outer wall toward said spout portion of said funnel shaped upper deck, an outlet opening defined by an outer periphery of said spout portion and an inner end edge of said waste baffle, said outlet connecting said collecting chamber with said outlet passage, an injector defining at least one injector passage extending through said upper deck and said waste baffle and opening into said chamber space outward of said outlet opening and adjacent to the outer periphery of said chamber, said injector passage being shaped to inject liquid from said tank into said chamber and to impart a significant component of velocity of the liquid flowing through said injector passage substantially tangent to said chamber so that said water injected into said chamber flows in a helical path along said substantially conical shaped bottom and passes out through said outlet opening into said outlet passage, and a debris outlet from said chamber at said bottom of said chamber adjacent to said apex.

Preferably, said waste baffle is frusta-conical in shape sloping downward toward said bottom wall from said periphery of said chamber.

Preferably there are a plurality of said injectors symmetrically positioned around said axis.

Preferably the ratio of the open area of said outlet opening to the total cross sectional area of said at least one injection passage is between 0.5 and 1.

The present invention also relates to a method of cleaning debris from the water in a tank comprising providing a collecting chamber at the bottom of said tank, injecting water caring debris from said tank into said collecting chamber adjacent to an outer periphery of said chamber to define vortical flow in said chamber between a conical bottom wall of said chamber and a waste baffle forming a top of said chamber, flowing cleaned fraction of said water from said chamber as a vortex through an outlet opening between said waste baffle and an adjacent portion of a concentric funnel shaped upper deck, passing cleaned water exiting from said outlet opening through an outlet passage formed between said waste baffle and said upper deck as an expanding vortex in said outlet passage and removing a debris rich fraction of said water from said chamber adjacent to said bottom of said chamber.

Preferably said water containing debris is injected into said separation chamber at a tangential velocity to said chamber of at least 0.4 meters/second and more preferably between 0.4 and 1.5 meters/second.

BRIEF DESCRIPTION OF THE DRAWINGS

Further features, objects and advantages will be evident from the following detailed description of the preferred embodiments of the present invention taken in conjunction with the accompanying drawings in which.

DESCRIPTION OF THE PREFERRED EMBODIMENTS

Figure 1:
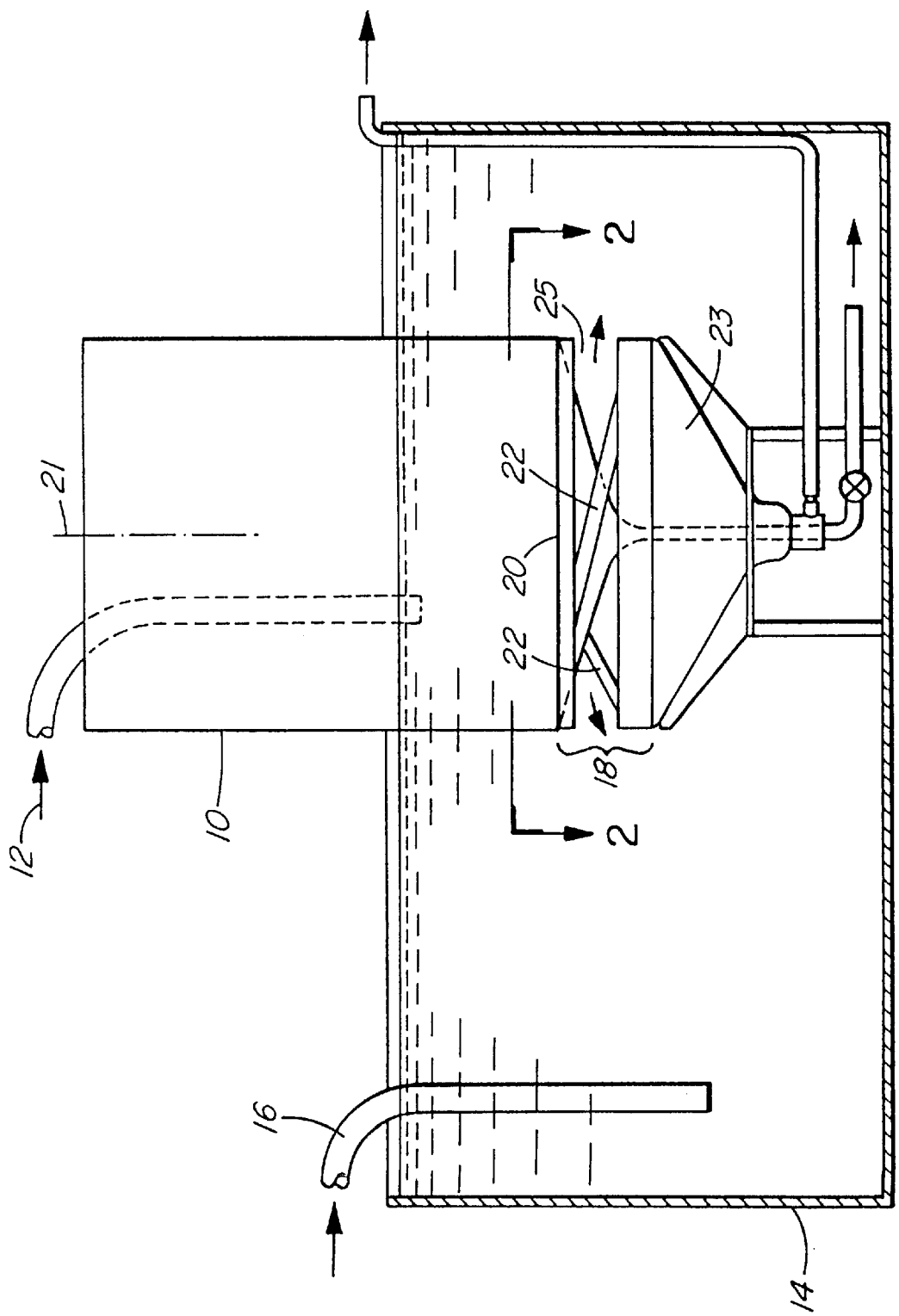
FIG. 1 is a side elevation illustrating the present invention in a test set up.

An experimental arrangement for testing the present invention is schematically illustrated in FIG. 1. As illustrated the invention consists of the fish tank 10 that in a commercial application may take any suitable form e.g. a bag. The tank 10 has a water inlet 12. In the test set up the tank 10 is contained within a suitable confinement tank 14 having a water inlet 16. It will be apparent that in a commercial installation, if the tank 10 is rigid, it can be self-supported or supported by float but as above indicated, in many cases, the tank 10 is formed by a flexible bag which is immerse in the containing water i.e. in the ocean, lake or the like and held up by floats generally encircling the tank or bag 10. In FIG. 1 the outer tank 14 represents the ocean or lake i.e. the containing body of water.

The bottom of the tank or bag 10 is provided with the waste trap 18 of the present invention. In the illustrated arrangement, the waste trap 18 has a diameter substantially the same as that of the tank or bag 10. However, in practice, the tank or bag 10 will normally have sloping sidewalls and will have a significantly larger diameter at its upper end tapering down to the diameter of the waste trap 18.

Figure 3:
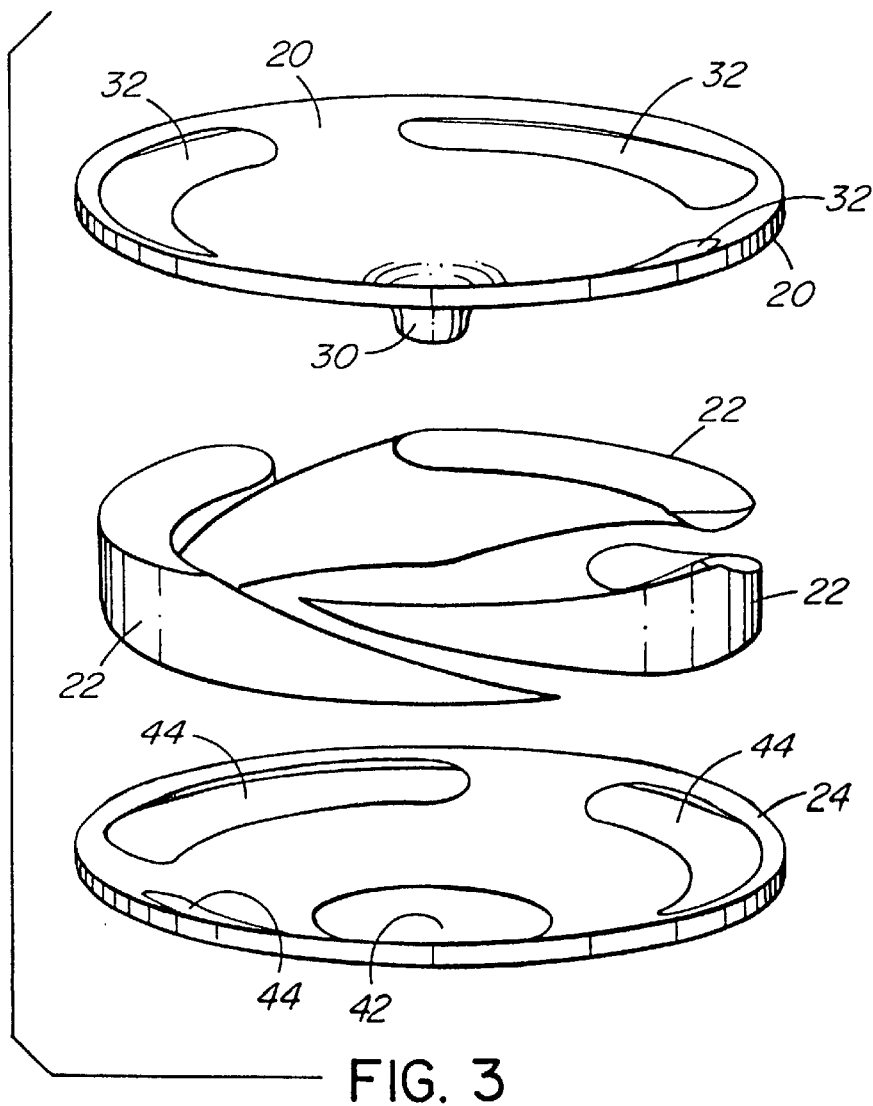
FIG. 3 is an exploded isometric illustration of the top deck, the injectors and the waste baffle that form the essential elements of the present invention.
Figure 4:
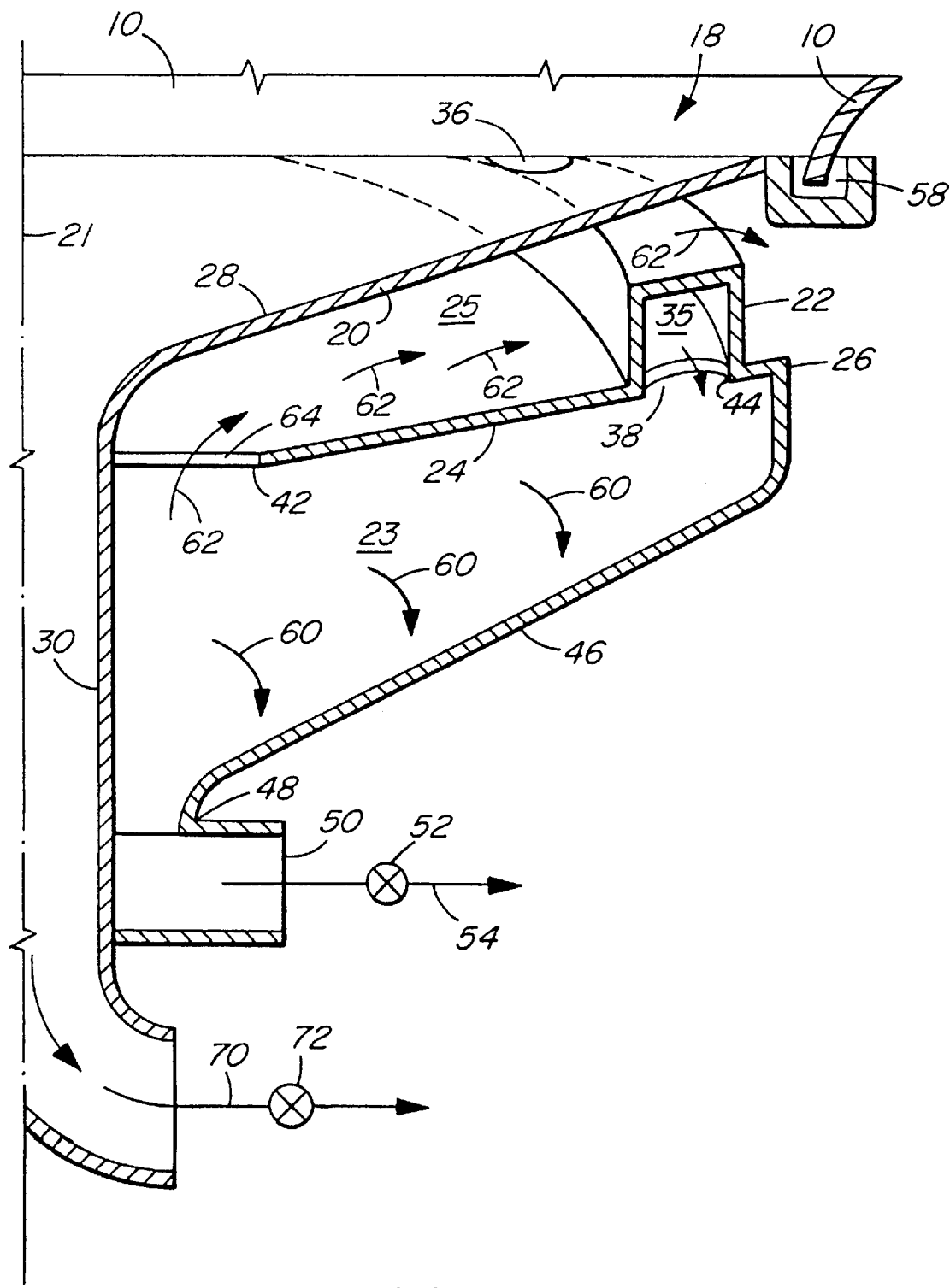
FIG. 4 is a cross-section through the collecting chamber illustrating the operation of the system.

As shown in FIG. 3, the waste trap 18 is composed of three main components, an upper deck 20, a plurality of injectors 22 (in the illustrated arrangement, three such passages have been shown) symmetrically positioned around the axis 21 of the waste trap 18 and a waste collecting chamber 23 having an outer wall 26 with a substantially conical shaped bottom wall portion 46 (see FIG. 4). The top of the chamber 23 is formed by a waste baffle 24 which is axially spaced from the upper deck 20 to define an outlet passage 25 between the baffle 24 and the top deck 20. While the outer wall 26 and portion 46 are normally made of rigid material they may be flexible provided the internal pressure forces these wall to conform to the required shape to form the separation chamber 23.

The top or upper deck 20 is concentric with axis 21 and is substantially funnel shaped having a conical deck portion 28 tapering down into a cylindrical spout portion 30 forming outlet passage which extends out through the bottom wall 46 of the collecting chamber 23 (see FIG. 4).

The injectors 22 (three in the illustrated arrangement) extend through openings 32 in the upper deck 20 adjacent to its outer periphery, across the passage 25 through the waste baffle 24 and into the chamber 23. The injectors direct water from the tank 10 into the chamber 23 and impart a velocity component tangential to the axis 21 to the water entering the chamber 23.

Figure 2:
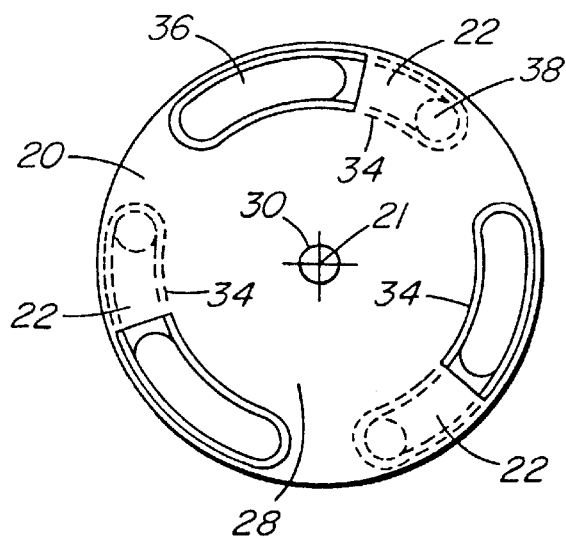
FIG. 2 is a section along the line 2—2 of FIG. 1 looking down onto the top of the separation chamber and showing the position of the injectors.

The injectors 22 are preferably essentially the same and are preferably symmetrically arrange around the top deck 22 adjacent to it outer periphery. Each of the injectors 22 is formed as a tubular structure defining injector passages 35 having an upper inlet 36 opening into the tank 10 and a lower outlet 38 opening into the chamber 23 (see FIGS. 2 and 4).

The waste baffle 24 is substantially frusta-conical in shape and is provided with a central opening 42 and a plurality of circumferential openings 44, one to snugly receive each of the injectors 22. The baffle 24 closes a significant portion of the top of the chamber 23 and as above described is axially spaced from the deck 20 to define the outlet passage 25 therebetween.

Turning to FIG. 4, it will be apparent that the conical bottom wall portion 46 the outer wall 26 of the chamber 23 leads to a bottom sump 48 having a debris outlet 50 through which debris may selectively be removed by operation of the valve 52 as schematically illustrated by the arrow 54. The sump 48 forms the bottom end of the chamber 23 of the waste trap 18.

The outlet passage 25 is defined between the upper surface of the waste baffle 24 and the lower surface of the top deck 20. The central opening or hole 42 formed at the lower end (frusta-conical end) of the baffle 24 encircles the passage or spout portion 30 of the top deck 20 and defines an outlet opening 64 between the spout portion 30 and the inner end or edge of the baffle 24 that connects the chamber 23 with the outlet passage 25.

In the illustrated arrangement the injectors 22 and the spout portion 30 form the means of connection between the chamber 23 and the top deck 20 and thus with the tank 10 as the deck 20 is connected to the bottom of a bag or tank 10 via suitable clamping flanges 58.

It is clear from FIG. 4 that the waste trap 18 of the present invention forms a cleaning system wherein the waste stream entering the separation chamber 23 through the injectors 22 as indicated by the arrow 60 has a substantial component tangential to the outer wall 26 of the chamber 23 so that the incoming stream tends to spin and travel down in a spiral along the conical wall 46 toward the sump 48. The centrifugal action via the rotational flow of the liquid entering the chamber 23 causes the sediment which is higher density than the water to tend to separate toward the surface 46 and pass down into the sump 48. The cleaned fraction of the water, as indicated by the arrow 62, passes into the passage 25 through the outlet opening 64 formed between the edge of the opening 42 in the waste baffle 24 and the outside of the pipe or spout 30 of the top deck 20.

The outlet opening 64 between the chamber 23 and the passage 25 is sufficiently small that the flow in the chamber 23 tends to deposit the debris in the chamber 23 and sump 48. It is believed that as the liquid flows as a vortex through the opening 64 the particles contained in the vortex tend to be flung out due the acceleration induced by the rotation. The hole or passage 64 is sized so that particles of a selected size are predominantly rejected back into the chamber 23 before passing through the opening 64. These particles find their way to the sump 48 from which they are ejected from the unit.

The cleaned liquid (water) flows from the outlet 64 and passes through the outlet passage 25 and is returned into the surrounding body of water from which the incoming water entering through inlet 12 is obtained.

The position and shape of the openings 36 and 38 and the passage 35 are such that flow in the injectors 22 injectors direct flow into the chamber 23 with a tangential velocity component of at least 0.4 meters/second, preferably between 0.4 and 1.5 meters/second.

It will be apparent that it is important that the dimensions of the injectors 22, i.e. the size of the injector passage and the relative size of the outlet 64 and outlet passage 25 are important to obtaining the required circulation or flow of liquid 6 through the unit to cause the debris of the selected size and/or weight to be separated from the liquid in the trap 18. It will also be apparent that substantially all the water injected via inlet 12 must pass through the outlet opening 64 and outlet passage 25 except for a small amount that leaves with the debris through outlet 50.

As above indicated it has been found that a flow rate to obtain a tangential velocity of at least 0.4 meters per second into the chamber 23 is effective to obtain separation of debris. This may vary depending on the actual dimensions of the unit i.e. a large diameter unit may require a different velocity than a small diameter unit.

It has also been found that ratio of the open area of the outlet opening 64 to the total open area of said injector passages 38 to be quite effective should be in the range of about 0.5 to 1.

The substantially vertical pipe or spout 30 of the upper deck 20 leads to an outlet line 70 that is provided with a valve schematically indicated at 72. This spout 30 and line 70 and valve 72 provide a system for withdrawing fish or whatever is being grown in the tank 10 out of the tank. Thus, the valve 72 is only open when it is desired to empty the tank of fish.

EXAMPLE

The effectiveness of the concept was tested in a unit having an upper deck with a diameter of 3 meter diameters, 3 injector 22 each with a cross sectional area of 0.24 square meters and an outlet 64 of 0.47 square meters.

The tangential velocity of the fluid entering the chamber 23 through each of the injectors 22 was about 1 meters/second. Under these conditions the separation of synthetic debris of was to a specific gravity size dependent. To test the limit of the system test particles having diameters of 2 mm, lengths of 3 mm and a specific gravity of 1.14 were tested and the degree of separation was found to be 23%, but particles having essentially the same dimensions but a slightly greater specific gravity of 1.21 increased the degree of separation to 75%.

The effectiveness of the present invention in separating natural sediments from the water and removing them from the system was found to average above 90% separation.

Having described the invention, modifications will be evident to those skilled in the art without departing from the scope of the invention as defined in the appended claims.

What is claimed is:

1. A method of cleaning debris from the water in a tank comprising providing a collecting chamber at the bottom of said tank, injecting water carrying debris from said tank into said collecting chamber adjacent to an outer periphery of said chamber to define vortical flow in said chamber between a conical bottom wall of said chamber and a waste baffle forming a top of said chamber, flowing cleaned fraction of said water from said chamber as a vortex through an outlet opening between said waste baffle and an adjacent portion of a concentric funnel shaped upper deck, passing cleaned water exiting from said outlet opening through an outlet passage formed between said waste baffle and said upper deck as an expanding vortex in said outlet passage and removing a debris rich fraction of said water from said chamber adjacent to said bottom of said chamber.

2. A method as defined in claim 1 wherein said water carrying debris is injected into said separation chamber at a tangential velocity to said chamber of at least 0.4 meters/minute.

3. A method as defined in claim 1 wherein said water carrying debris is injected into said separation chamber at a tangential velocity to said chamber of between 0.4 and 1.5 meters/second.

* * * * *